United States Patent Office 3,203,765
Patented Aug. 31, 1965

3,203,765
PRODUCTION OF CARBON BLACK
Joseph Iannicelli and Andries Voet, Borger, Tex., assignors to J. M. Huber Corporation, Locust, N.J., a corporation of New Jersey
No Drawing. Filed Apr. 19, 1962, Ser. No. 188,857
6 Claims. (Cl. 23—209.4)

The present invention relates to the continuous production of carbon black by the decomposition of hydrocarbons at high cracking temperatures, as by well known "furnace" processes, and to methods of producing chemically modified liquid hydrocarbon compositions useful in such production and for analogous high temperature reactions. More particularly, it relates to a method of carrying out furnace black production whereby the carbon black may be produced quite uniformly with a modified particle structure giving it improved properties for certain uses, without the occurrence of irregularities otherwise found in its pelletizing, dispersing and rubber strengthening characteristics.

The present invention is an improvement over assignee's copending application Serial Number 186,364, filed April 10, 1962, entitled "Modified Carbon Black Production and Hydrocarbon Compositions."

Furnace carbon black is produced by the decomposition of vaporized liquid hydrocarbons or of mixtures thereof with normally gaseous hydrocarbons. Use commonly is made of feed-stocks composed larely of heavy liquid hydrocarbons; for instance, heavy aromatic fractions or residues of the cracking of petroleum to produce motor fuels. The resulting carbon black, in contradistinction to "channel" black obtained by the decomposition of natural gas at lower temperatures, typically possesses an aggregated or chained particle structure. As is discernible from electron micrographs, the individual or ultimate particles of the carbon have a marked tendency to link together in clusters, agglomerates or chains. These resist being broken apart or tend to re-form if broken apart in the course of dispersion of the product, as in the milling of rubber compounds. Consequently, rubber vulcanizates reinforced with furnace black generally have a considerably greater modulus of elasticity, or less elasticity, than do those similarly reinforced with channel black.

It is well known that the particle structure and consequent rubber reinforcing properties of furnace carbon black are significantly influenced by variations of the composition or the purity of the feedstock from which the black is formed and that the structure and properties of the product can be modified in various ways; for example, by selection of the feedstock according to its composition or by the incorporation of small amounts of foreign substances or additives into the feedstock to give it a desired composition.

It is also known, more particularly, that minute concentrations of alakli metals or of compounds containing them, when present or added as foreign substances in carbon black production, will cause modifications of the particle structure of the product and result in carbon black which, when dispersed in rubber, will give vulcanizates having increased elasticity along with the required strength and resistance to tear and abrasion.

According to U.S. Patent No. 2,665,194, vapors of a liquid hydrocarbon feedstock are condensed upon nuclei of sodium chloride vapor before being carried in admixture with a hydrocarbon gas into a cracking zone for decomposition into carbon black. The carbon black so produced is described as having rubber properties essentially identical to those of blacks produced from natural gas alone.

According to FIAT Final Report No. 1128 (1945), P.B. 88805, page 15, .001% of sodium hydroxide is added to a liquid hydrocarbon before the hydrocarbon is fed into a furnace for decomposition into carbon black.

When an alkali metal in metallic form or in the form of a compound such as a chloride or a hydroxide is brought into a carbon black reaction by known methods, such as by injection or in solution or by addition to a liquid or vaporized hydrocarbon feedstock, it is difficult or impossible to select and control the reaction conditions so precisely that the extent of modification of the product may be chosen at will, or so that the carbon black will be produced continuously with a particular desired structure and uniform pelletizing, dispersing and rubber reinforcing properties.

Among other manifestations of the variability of product qualities are the facts that the voltmeter of the electrostatic precipitator in which the black is separated from the reaction gases tends to fluctuate erratically, and that upon the addition of water at a constant rate to a stream of the separated black, for the formation of pelletizing paste, the level and flow qualities of the paste vary erratically.

We have found that the variability of product qualities is attributable to the lack of a completely uniform, determinate distribution of the alkali metal in the reaction zone of the production furnace and to the existence of a delicate relationship between the concenration of alkali metal maintained in the reaction zone and the structure of the resulting carbon black.

It is important to fix and hold the concentration of alkali metal effective in the reaction exactly at a specified minute value that will give the particular modified structure and properties desired in the product. The concentration required is always extremely small, being, for example, as little as a fraction of one part per million of the weight of the feedstock supplied into the furnace. Minute variations from a specified concentration, whether upward or downward, have marked effects upon properties of the black produced. Yet such variations have not been avoidable in the use of known methods.

It is an object of this invention to provide a carbon black furnace feedstock reacted with an alkali base dissolved in alcohol and a method by which troublesome irregularities of production and variations of product qualities heretofore experienced in the modification of furnace carbon black by the action of alkali metals can be fully overcome, and by which any desired extent of such modification can be brought about and can be maintained with precision in continuous furnace operations.

A further object of this invention is to provide a feedstock of the class described above chemically modified with alkali metal cations.

A still further object of this invention is to chemically modify a carbon black furnace feedstock by a reaction with alcoholic solutions of alkali bases.

Another object is to enable the effective use of "master" batch techniques in the production of alkali-modified furnace carbon black, so that bulk supplies of feedstocks provided and stored in their natural or as-procured condition can be modified to contain an exactly determined minute concentration of alkali metal while being fed or when ready to be fed to the furnace, by mixing with a production batch or stream of the feedstock a proportioned batch or stream of liquid hydrocarbon carrying therein a definite concentration of alkali metal far higher than that required for the reaction in the furnace.

The invention in this latter aspect also enables any particular alkali metal concentration desired for the reaction to be fixed and maintained precisely notwithstanding variations of the concentrations of alkali metal which occur naturally in feedstocks derived from different mineral sources.

Further objects of the invention are to provide modified carbon blacks of improved and assuredly uniform quality and to advance the art of carbon black production.

According to the present invention, it has been discovered that the foregoing and other desirable objects can be achieved by the provision and the use of liquid hydrocarbon feedstocks suitable for the production of furnace carbon black, in which minute concentrations of alkali metal have been distributed by reaction of the feedstock with alkali metal bases dissolved in alcohol.

Accordingly, it is in general not feasible to secure the desired continuously uniform or exactly determined concentration of an alkali metal in the reaction zone of a carbon black furnace merely by the addition of inorganic salts of the metal to the feedstock; and the concentrations of dissolved alkali metal obtainable in hydrocarbon solvents by the direct addition of such salts thereto is not high enough to enable effective use of the resulting liquids in "masterbatching" techniques.

We have found, however, that distribution of alkali metal can be secured readily, and that masterbatch oils of high and precisely controlled alkali metal content can be prepared and used effectively by the use of alkali metal bases dissolved in alcohol reacted with the liquid hydrocarbon feedstock according to the invention.

In the practice of the invention, the alkali metal base is dissolved in lower aliphatic alcohols and the solution is then added in a definite proportion to the feedstock, or to a masterbatch of a carrier or solvent oil that is to be proportioned into the feedstock for incorporation of the additive thereinto. The oil used for the preparation of such a master-batch may be, for example, kerosene, fuel oil, diesel oil, petroleum, or a portion of the furnace feedstock itself, such as an aromatic gasoline cracking residue.

It has been found that conventional feedstock oil has an appreciable content of acidic substituents including mercaptan, phenolic, and carboxyl groups. Acidic (or active) hydrogen of the feedstock can be replaced by alkali cations to furnish chemically modified feedstock compositions. In order to replace the acidic hydrogen with alkali cations, it is necessary to have an intimate contact between an alkali base and the feedstock. This intimate contact can be produced by use of a vehicle in which both the feedstock and the alkali base are mutually miscible; i.e., a mutual solvent.

Alkali bases which have been found to be particularly useful in practicing the invention are the hydroxides, propoxides, butoxides and pentanoxides of any of sodium, potassium, cesium and rubidium. Mixtures of these alkali bases have also proved effective in practicing the invention.

Vehicles which are mutually miscible with both the alkali metal base and the feedstock are $C_3$ to $C_5$ aliphatic alcohols with $C_4$ and $C_5$ aliphatic alcohols giving superior results and being the most preferred. Lower aliphatic alcohols which have been found to be effective in practicing the invention are propanol-1, propanol-2, butanol-1, butanol-2, 2-methyl-propanol-1, pentanol-1, pentanol-2, 2-methylbutanol-4, 3-methylbutanol-4, 2-methylbutanol-3, and pentanol-3.

The feedstock modified according to the invention, whether prepared by direct addition of the alkali base alcohol solution or by addition of a masterbatch solution thereof, is easily made to contain the alkali metal in a perfectly uniform and correctly proportioned distribution throughout the oil. Following reaction of the feedstock with the alkali base dissolved in the mutual solvent, a completely homogeneous distribution of the alkali metal in the feedstock is obtained. The chemically modified feedstock is stable against separation of the alkali component from the feedstock even under prolonged storage. When it is vaporized and enters into the pyrolysis reaction in the furnace, its alkali metal content passes through the reaction and into the carbon black with the same perfect distribution. Thus, the concentration of the alkali metal that will be effective for modification of the product can be selected and maintained certainly and continuously at any desired value, including any of the extremely minute values at or approaching the threshold of the full effectiveness of the alkali metal or any higher value that may be desired; and the resulting carbon black is continuously and predictably uniform in its structure and its related pelletizing, dispersing and rubber reinforcing properties.

Furthermore, no impurity other than the pre-set concentration of alkali metal is introduced into the product since the components combined with and carrying the alkali metal are themselves pyrolyzed in the furnace so as to be a source of carbon or heating gas only.

The various solutions of alkali bases and alcohols herein set forth can be used to secure remarkably uniform effects upon the quality of the carbon black. While only a minute proportion of any of them is ordinarily required in the feedstock in order to obtain a desired modification of the carbon black with minimal impurification of the product, any of a wide range of proportions from as little as 0.1 part per million up to 10,000 parts per million or even a higher minor proportion, calculated as alkali metal and based upon the weight of the feedstock, can be selected and used as desired. The minimal concentration, however, is considerably smaller in the use of cesium or rubidium salts than it is in the use of salts of potassium or sodium.

The selectability and the continuous uniformity of carbon black structure and properties, as obtained according to the invention, are highly advantageous for commercial carbon black production. Their value in eliminating occurrences of off-grade products and in assuring that the modified black will fulfill use specifications is self evident. They also have another important advantage, in that the product can be wet pelletized continuously by the addition of water to a stream of it at a constant rate, without encountering troublesome variations of the level or the flow of the resulting paste; whereas, in the wet pelletizing of carbon black that is not continuously uniform in particle structure the flow and level of the paste vary erratically and adjustments of the operations are required continually in order to avoid the formation of off-grade pellets.

The practice and advantages of the invention will be further apparent from the following illustrative examples.

*Example 1*

Carbon black production was carried out by the use of a furnace substantially of the type disclosed in U.S. Patent No. 2,623,811 to Ira Williams, with the rate of 200 gallons per hour.

The feedstock was a heavy residual oil from the cracking of petroleum to produce motor fuel, of the type commonly used to produce a standard ISAF carbon black. The carbon black obtained by the use of this feedstock without modificaiton had an oil absorption of 98 grams of linseed oil per 100 grams of black and a pellet density of 23.7 pounds per cubic foot, as determined by A.S.T.M. standard method D1513.

A solution of potassium hydroxide in butanol was prepared by gradually adding 1.69 pounds of the hydroxide to 5 gallons (35.45 lbs.) of rapidly stirred butanol-1 over a period of 10 minutes. Stirring was continued for 30 minutes after the addition was completed. A clear solution containing 4.76% potassium hydroxide in butanol-1 was obtained.

A "masterbatch" of modified feedstock oil was prepared by adding this solution of potassium hydroxide in butanol-1 into a portion of the normal feedstock to obtain in the oil an additive concentration equal to 0.5% of potassium. The potassium hydroxide solution dissolved and reacted readily and formed a completely homogeneous system.

The masterbatch was carefully proportioned into the feedstock stream flowing to the preheater of the furnace, by means of a positive displacement proportioning pump which delivered the potassium salt solution at the rate of 1.0 gallon per hour. Complete blending of the mixed oils was obtained in the pipe line leading to the furnace oil intake, as was verified by careful tests. The modified feedstock contained 0.0025% of potassium in completely homogeneous distribution.

The carbon black resulting from the pyrolysis of the modified feedstock was obtained continuously with a notably reduced structure and with modified properties which underwent no appreciable deviations during the production. Its oil absorption was 88 g./100 g. and its pellet density was 27.0 lbs./cu. ft.

The continuous uniformity of the modified furnace product was clearly manifested by the facts that (1) the voltmeter of the electrostatic precipitator in which the black was separated from the reaction gases remained steady during the production, and (2) upon the addition of water to the stream of separated black at a constant rate for the continuous formation of pelletizing paste, the level and flow of the paste remained constant.

*Example 2*

The procedure of Example 1 was carried out except that a solution of potassium hydroxide in mixed pentanols was used to modify feedstock chemically. The solution was prepared by dissolving 30 pounds of potassium hydroxide in 285 pounds of mixed pentanols to give a clear solution containing 9.52% potassium hydroxide. The pentanol mixture contained primary and secondary alcohols and was obtained under the trade name "Pentasol 26" from Pennsalt Chemicals Corporation.

A masterbatch of modified feedstock was prepared by adding and stirring the above soltuion into a portion of normal feedstock to obtain in the oil an additive concentration of 1.0%. The masterbatch was proportioned into the feedstock stream as in Example 1 to furnish a modified feedstock containing 0.0025% potassium in completely homogeneous distribution. Carbon black prepared from this modified feedstock had an oil absorption of 81 g./100 g. and its pellet density was 29.0 lbs./cu. ft.

*Example 3*

The carbon black production was carried out as described in Example 1, except that a solution of 25 parts sodium propoxide in 100 parts propanol was blended into feedstock to provide a masterbatch of a concentration equivalent to 1.25% metallic sodium. The resulting concentration in the main feedstock stream was 0.0014% sodium in homogeneous distribution.

The resulting carbon black was obtained continuously with a uniform low structure and other advantageous properties described. The oil absorption was 81 g./100 g. and its pellet density was 29.5 lbs./cu. ft.

This same procedure was repeated using a solution of sodium butoxide in butanol-1 and gave similar results.

*Example 4*

The carbon black production was carried out as described in Example 1, except that a solution of 5 parts rubidium hydroxide in 95 parts pentanol-1 was prepared by gradual addition of hydroxide to the stirred pentanol. This solution was diluted with No. 2 diesel oil so as to give a concentration equivalent to 0.5% metallic rubidium. The diesel oil solution was carefully proportioned into Conoco feedstock, an extraction residue obtained by the Conoco process of petroleum cracking, at such a rate to give a concentration of 0.006% rubidium.

The resulting carbon black was obtained continuously with a uniform low structure and other advantageous properties described. Its oil absorption was 91 g./100 g., and its pellet density was 26.8 lbs./cu. ft.

*Example 5*

The carbon production was carried out as described in Example 1, except that a masterbatch was prepared as follows: a solution of 3 parts cesium hydroxide in 97 parts pentanol-2 was dissolved in feedstock to give a masterbatch containing 0.5% cesium and this was carefully proportioned into the feedstock mainstream at such a rate that this feedstock contained 0.0056% cesium.

The resulting carbon black was obtained continuously with a uniform low structure and other advantageous qualities described. Its oil absorption was 71 g./100 g. and its pellet density was 31.8 lbs./cu. ft.

While the present method is useful in the production of carbon black from the residual oil obtained from the cracking of hydrocarbons to produce motor fuels, it is not restricted to such oils. Other liquid hydrocarbons, such as crude petroleum oil, kerosene, gasoline, heavy or light naphthas, recycle oils, coal tar, etc. may be used. Nor is the method restricted to use with furnaces of any particular design or type.

We claim:

1. In the production of carbon black in a furnace operating continuously at high temperature, wherein a liquid hydrocarbon feedstock is fed continuosuly to the furnace and is vaporized and pyrolyzed therein to yield carbon, the method of continuously uniformly modifying the structure of the carbon black produced which comprises reacting with said feedstock a precisely proportioned amount of at least 0.1 part per million part by weight of an alkali metal base dissolved in a hydrocarbon misicible alcohol selected from the group consisting of $C_3$ to $C_5$ aliphatic alcohols, said amount of alkali metal base being directly related to the degree of modification in structure of the carbon black to be attained.

2. In the production of carbon black in a furnace operating continuously at high temperature, wherein a liquid hydrocarbon feedstock is fed continuously to the furnace and is vaporized and pyrolyzed therein to yield carbon, the method of continuously uniformly modifying the structure of the carbon black produced which comprises reacting with said feedstock a precisely proportioned amount of at least 0.1 part per million part by weight of an alkali metal base dissolved in a hydrocarbon miscible alcohol selected from the group consisting of $C_4$ and $C_5$ aliphatic alcohols, said amount of alkali metal base being directly related to the degree of modification in structure of the carbon black to be attained.

3. In the production of carbon black in a furnace operating continuously at high temperature, wherein a liquid hydrocarbon feedstock is fed continuously to the furnace and is vaporized and pyrolyzed therein to yield carbon, the method of continuously uniformly modifying the structure of the carbon black produced which comprises reacting with said feedstock a precisely proportioned amount of at least 0.1 part per million part by weight of an alkali metal base dissolved in a hydrocarbon miscible alcohol selected from the group consisting of propanol-1, propanol-2, butanol-1, butanol-2, 2-methyl-propanol-1, pentanol-1, pentanol-2, 2-methylbutanol-4, 3-methylbutanol-4, 2-methylbutanol-3, and pentanol-3, said amount of alkali metal base being directly related to the degree of modification in structure of the carbon black to be attained.

4. In the production of carbon black in a furnace operating continuously at high temperature, wherein a liquid hydrocarbon feedstock is fed continuously to the furnace and is vaporized and pyrolyzed therein to yield carbon, the method of continuously uniformly modifying the structure of the carbon black produced which comprises reacting with said feedstock a precisely proportioned amount of at least 0.1 part per million part by weight of an alkali metal base dissolved in a hydrocarbon miscible alcohol selected from the group consisting of $C_3$ to $C_5$ aliphatic alcohols, said alkali metal base selected from the group consisting of the hydroxides, propoxides, butoxides and pentanoxides of any of the alkali metals sodium, potassium, cesium, and rubidium, said amount of alkali metal base being directly related to the degree of modification in structure of the carbon black to be attained.

5. In the production of carbon black in a furnace operating continuously at high temperature, wherein a liquid hydrocarbon feedstock is fed continuously to the furnace and is vaporized and pyrolyzed therein to yield carbon, the method of continuously uniformly modifying the structure of the carbon black produced which comprises reacting with said feedstock a precisely proportioned amount of at least 0.1 part per million part by weight of an alkali metal base dissolved in a hydrocarbon miscible alcohol selected from the group consisting of $C_4$ and $C_5$ aliphatic alcohols, said alkali metal base selected from the group consisting of the hydroxides, propoxides, butoxides, and pentanoxides of any of the alkali metals sodium, potassium, cesium and rubidium, said amount of alkali metal base being directly related to the degree of modification in structure of the carbon black to be attained.

6. In the production of carbon black in a furnace operating continuously at high temperature, wherein a liquid hydrocarbon feedstock is fed continuously to the furnace and is vaporized and pyrolyzed therein to yield carbon, the method of continuously uniformly modifying the structure of the carbon black produced which comprises reacting with said feedstock a precisely proportioned amount of at least 0.1 part per million part by weight of an alkali metal base dissolved in a hydrocarbon miscible mixture of lower aliphatic pentanol alcohols, said amount of alkali metal base being directly related to the degree of modification in structure of the carbon black to be attained.

References Cited by the Examiner

UNITED STATES PATENTS

| | | | |
|---|---|---|---|
| 1,684,685 | 9/28 | Records | 44—53 |
| 2,914,418 | 11/59 | Eastman | 23—209.6 X |
| 2,922,709 | 1/60 | Hetzel | 23—209.4 X |
| 3,010,794 | 11/61 | Friauf et al. | 23—209.4 |
| 3,010,795 | 11/61 | Friauf et al. | 23—209.4 |
| 3,122,419 | 2/64 | Henderson | 23—209.4 |

MAURICE A. BRINDISI, *Primary Examiner.*